N. H. MEEKS.
CORN-PLANTER.

No. 180,615.  Patented Aug. 1, 1876.

WITNESSES:
Francis McArdle
John Goethals

INVENTOR:
N. H. Meeks
BY
[signature]
ATTORNEYS.

UNITED STATES PATENT OFFICE.

NATHAN H. MEEKS, OF SALADO, TEXAS.

IMPROVEMENT IN CORN-PLANTERS.

Specification forming part of Letters Patent No. 180,615, dated August 1, 1876; application filed February 5, 1876.

*To all whom it may concern:*

Be it known that I, NATHAN H. MEEKS, of Salado, Bell county, Texas, have invented a new and Improved Corn-Planter, of which the following is a specification:

My invention consists of a circularly-vibrating dropper-slide contrived to be attached to a plow-beam or other object to be drawn by a single horse, and be worked by the whiffletree, which has the requisite vibratory motion from the shoulder of the horse.

The invention is an improvement upon the planter described in Patent No. 8,408.

Figure 1:
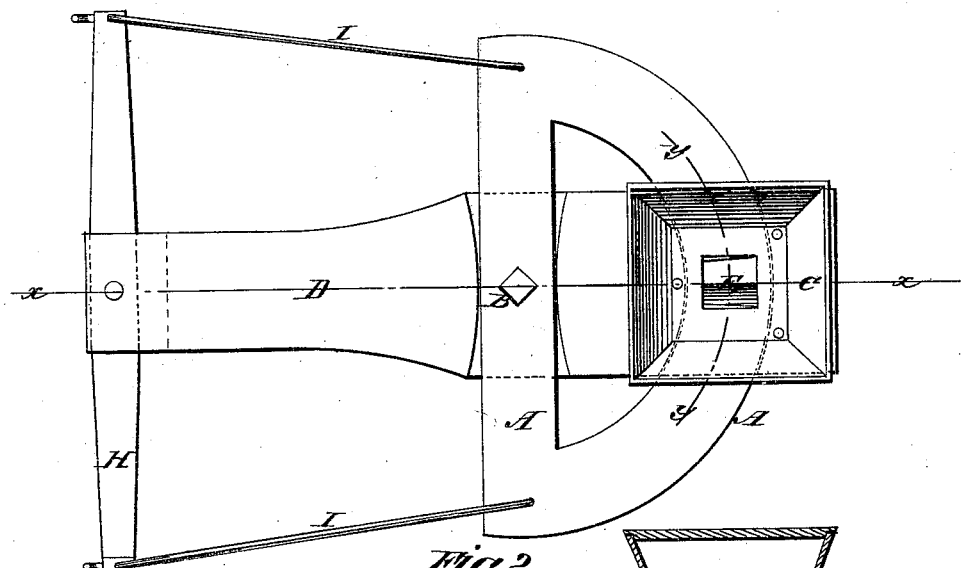
Figure 2:
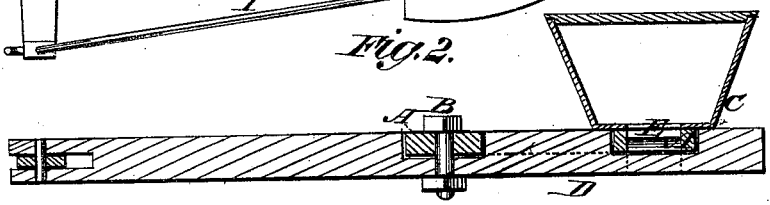
Figure 3:

Figure 1 is a plan view of my improved dropper. Fig. 2 is a longitudinal sectional elevation, taken on line $x\,x$, Fig. 1; and Fig. 3 is a transverse section, taken on line $y\,y$.

Similar letters of reference indicate corresponding parts.

A is a dropper-slide, having circular oscillating motion around the pivot B, over the bottom plate D, and under the hopper C, the said slide having two passages, E, in opposite directions from the mouth F, in which the grain falls from the bottom of the hopper, so arranged in relation to the passages G through the plate D that the grain is delivered to said passages alternately as the slide vibrates. The slide is connected at both ends with the ends of the whiffletree H by rods I, so that the vibrations of the whiffletree, caused by the working of the shoulders of the horse in walking, impart the necessary vibrations to the dropper-slide.

The bed-piece D may be attached to the beam of a plow or other object to be drawn along the ground.

Having thus described my invention, I claim as new and desire to secure by Letters Patent—

The combination, with the bed-piece D, provided with discharge-openings G G, of the curved or arc-shaped dropper-slide A, having inclined passages F E F E and the whiffletree H and rods T, all as shown and described.

NATHAN H. MEEKS.

Witnesses:
   THO. H. JONES,
   J. J. CARLOCK.